United States Patent [19]

Lechevallier

[11] 4,078,126

[45] Mar. 7, 1978

[54] ELECTRIC CELL

[75] Inventor: Claude Lechevallier, Amfreville la Campagne, France

[73] Assignee: Compagnie Industrielle des Piles Electroniques "CIPEL", Levallois-Perret, France

[21] Appl. No.: 806,351

[22] Filed: Jun. 14, 1977

[30] Foreign Application Priority Data

Jun. 30, 1976 France .................... 76 19904

[51] Int. Cl.² ........................... H01M 6/08
[52] U.S. Cl. .................... 429/166; 429/169; 429/171
[58] Field of Search ............. 429/166, 164, 168–174, 429/185

[56] References Cited

U.S. PATENT DOCUMENTS

| 3,433,681 | 3/1969 | Jammet | 429/170 X |
| 3,575,724 | 4/1971 | Jammet et al. | 429/166 X |
| 3,627,586 | 12/1971 | Jammet | 429/170 |
| 3,859,137 | 1/1975 | Jammet | 429/168 |

Primary Examiner—Anthony Skapars
Attorney, Agent, or Firm—Kenyon & Kenyon, Reilly, Carr & Chapin

[57] ABSTRACT

The invention relates to a preferably cylindrical electric cell having its anode constituted by a tube made of zinc for example. One end of the tube fits into a metallic cup having a bottom and a cylindrical wall; a gasket is interposed between the tube and a portion of the cup leaving a part of the cylindrical wall bare so as to provide both sealing by the gasket and electric contact between the tube and the cup. Application of the invention is especially to zinc-manganese dioxide cells.

6 Claims, 6 Drawing Figures

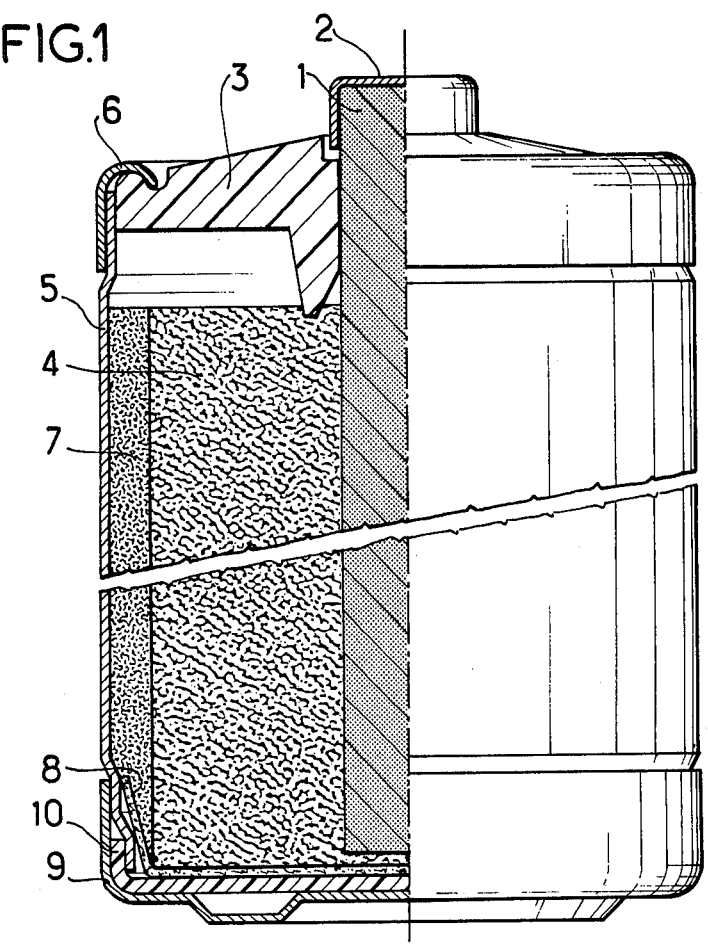
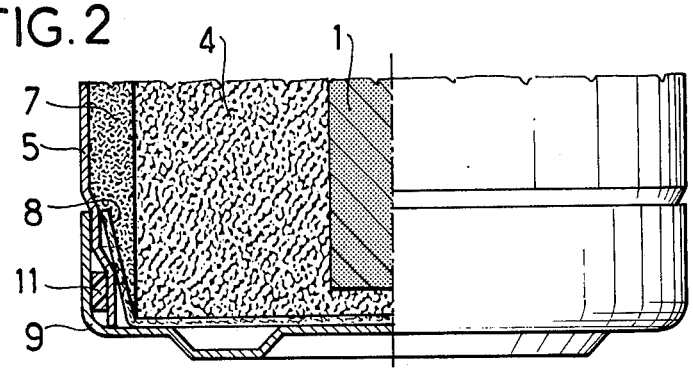

ELECTRIC CELL

The present invention relates to a cylindrical electric cell and particularly but not exclusively to an electric batttery whose negative electrode serves partially as a receptacle for the remainder of the active materials of the battery. It also relates to methods for manufacturing such a cell.

Well known cylindrical cells comprise a zinc can which constitutes simultaneously the negative electrode and the receptacle for part of the active material of the battery. It has already been proposed to replace the can by an assembly constituted by a sheet of anode material wound into the shape of a tube and having a metal cup fitted over the tube, either for reasons of economy or because a material was used which is more difficult to shape than zinc. The cup serves as a negative output terminal for the battery current. The disadvantage of such an assembly in relation to the can made of anode material is that it is not sealed, even at the metal-to-tube contact which is a metal-to-metal contact and that it is therefore imperative to provide a special sealing device outside this assembly. Sealing can be provided by in situ moulding of a casing made of a plastics material, described in French Pat. No. 2,063,610 filed on Oct. 23, 1969, British Pat. No. 1,257,576 of Dec. 8, 1969, Japanese Pat. No. 617,005 of Feb. 18, 1971 and U.S. Pat. No. 3,627,586 but this is a relatively expensive method.

Preferred embodiments of the present invention make it possible cheaply to produce a tube-cup assembly which is sealed at its lower part and which, once made part of a cell, does not require more sophisticated sealing means than those which are provided with a one-piece can.

The present invention provides a cylindrical electric cell in which at least the positive active material and the electrolyte are contained in a receptacle partially formed by the negative electrode, said negative electrode being in the form of a tube at one end of which a metal cup is fitted, said cup being shaped as a bottom with a cylindrical wall and constituting the bottom of the receptacle and the negative output of the cell, characterized in that the wall of said tube is continuous and in that a sealing gasket is so interposed between the tube and the metal cup as to leave at least part of the height of said cylindrical wall of the cup bare whereby a portion of said wall is in electrical contact with the tube.

Thus, a sealed receptacle has been constituted to replace the usual can, since the tube of negative active material (zinc, magnesium, aluminum . . . ) is not split and a gasket is interposed on a part of the cup between the end of the tube or a part near this end and the cup; a part of the cylindrical wall of the metal cup continues to be in contact with the negative tube, this making it possible to use the bottom of the cell as a negative current output terminal of the cell.

The gasket can be constituted by a ring of plastic or elastomeric material or by a disc made of one of these materials. But it could also advantageously have the shape of a dish whose cylindrical edge is trapped between the cylindrical walls of the cup and of the end of the tube.

According to a preferred embodiment, this dish is formed from a disc whose edges are turned up between the tube and the cup during assembly.

The invention also relates to methods of manufacturing the electric cell according to the invention.

A first method comprises the steps of disposing the gasket on one end of the tube, said gasketed end having an outside diameter of less than the inside diameter of the cup; inserting the gasketed end into the cup; swaging together the tube, the cup and the gasket in such a way as to ensure electrical contact between the cup and the tube while sealing these parts together; filling the receptacle thus formed with active material; and finally closing the receptacle to complete the cell.

In a second method the outside diameter of the tube is substantially equal to the outside diameter of the cup; the second method comprises the steps of reducing the outside diameter of one end of the tube to less than the inside diameter of the cup; disposing the gasket on said end of reduced diameter; inserting the gasketed end into the cup; expanding the outside diameter of the end of the tube to compress the gasket against the cup; filling the receptacle thus formed with active material; and finally closing the receptacle to complete the cell.

The invention will be better understood from the detailed description hereinbelow of four embodiments, given by way of example with reference to the accompanying drawings, in which FIG. 1 is a partial cross-section of a first embodiment of an electric cell embodying the invention;

FIG. 2 is a partial cross-section of a second embodiment of the bottom part of a cell embodying the invention;

Figure 3:
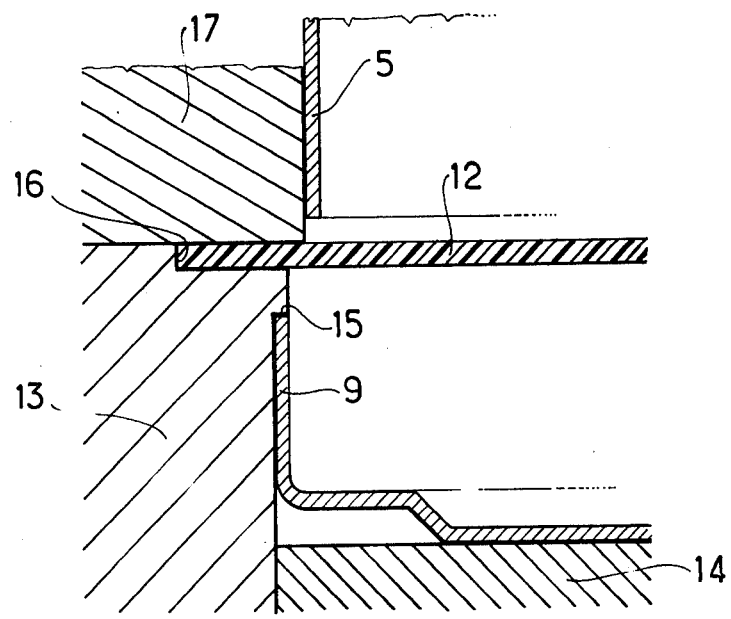
FIG. 3 is a partial cross-section of a phase in a production method according to the invention.

The embodiments which will be described by way of an example are those of a zinc-maganese dioxide cell. However, the invention applies to other electrochemical systems; in particular, the shape and the disposition of the positive electrode inside the battery and the closure at the top part of the battery could be different.

FIG. 1 shows the carbon rod 1 with a metal cap 2 which passes through a stopper 3 made of a plastic material and penetrates into the depolarizer 4. The stopper 3 enters one end of a zinc tube 5 to which it is made integral by a metal ring 6 interlocking with the edge of the stopper and fixed by swaging onto the tube 5. The tube 5 is separated from the depolarizer 4 by a separator 7 impregnated with gelled electrolyte and by the edges of a disc 8 made of craft paper or like material on which the base of the depolarizer rests.

A metal cup 9 is fitted onto the other end of the tube 5 with which it is in contact by its edge up to a certain height. This cup can be made of tin-plated iron or any other suitable metal or alloy. A dish 10 is interposed between the end of the tube 5 and the cup 9 so that its up-turned edge will be trapped and compressed between the lower part of the cylindrical wall of the cup 9 and the end of the tube 5. This dish 10 is made of an elastomeric or plastic material which is sufficiently resilient for this compressed part to form a sealing gasket. The plastic material which are suitable for this dish include polyvinyl chloride, polyethylene, nylon, etc. More complex assemblies can also be used, e.g., craft paper-polyethylene. The sealing of the assembly formed by the zinc tube 5 and the cup 9 is therefore provided by the up-turned edge of the dish 10. It will be observed that in this disposition, the disc 8 is not indispensable if the separator 7 extends up to the bottom of the dish 10.

FIG. 2 is an embodiment of the bottom part of an analogous cell in which the dish 10 has been replaced by a ring 11 made of the same material. The same references as in FIG. 1 designate the same components of the cell.

The cell shown in FIGS. 1 and 2 can be assembled as follows.

The gasket, i.e., the dish 10 or the ring 11 is disposed at the end of the tube 5 and this end thus packed is inserted in the cup 9 whose inside diameter is sufficiently large to accomodate it without difficulty. The assembly 5-10-9 or 5-11-9 is then swaged to the diameter of the tube 5. A can with a sealed bottom is thus obtained, it is then filled according to known techniques with the disc 8, the separator 7, and the depolarizer 4 fitted with its rod 1.

The plug 3 is then pushed into the tube 5 and round the rod 1 and once it has been installed the ring 6 is fixed, for example by swaging, on the tube 5. This ring 6 is of deformable material such as metal.

In another embodiment, it is possible to begin by shrinking one end of the tube 5 which is then fitted with the dish 10 or with the ring 11. This end is then inserted into the cup 9 whose outside diameter is equal to the largest outside diameter of the tube 5. The shrunken end of the tube 5 is then allowed to expand and compresses the rim of the dish 10 or of the ring 11 against the cylindrical inner wall of the cup 9. Again, a can with a sealed bottom is obtained which has a shape analogous to that of the can obtained by the first method described hereinabove. The other cell contents are then assembled in the same way within the tube 5.

Figure 4:
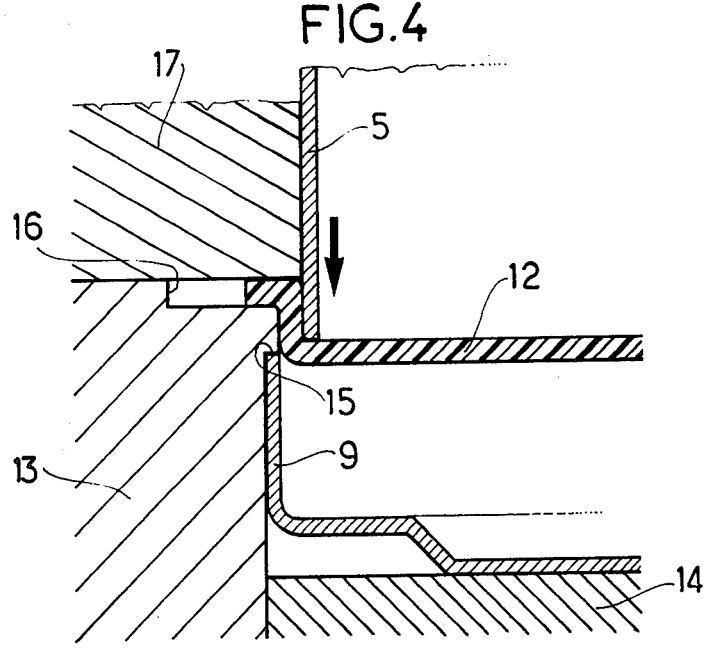
FIG. 4 is a partial cross-section of another phase in the method of FIG. 3.

FIGS. 3 and 4 illustrate phases of another variant of the production of a cell embodying the invention in which a dish similar to that of dish 10 is shaped during production from a disc made of deformable plastic material.

The cup 9 is disposed in a support 13 in the interior space of which is fitted its cylindrical wall abutting against a shoulder 15. The cup 9 rests on a removable plate 14. A disc 12 made of a plastic material similar to that of dish 10 then is laid on the top part of the support 13 in a recess provided by a second circular shoulder 16. The tube 5 is friction fitted into the interior cylindrical space of a second support 17.

FIG. 3 shows the tube 5 which has just been inserted in the support 17 and has not yet been pushed against the disc 12. FIG. 4 shows the beginning of the sinking of the tube 5 into the cup 9. As will be seen, the disc 12 is driven towards the cup 9 and, as its edges are turned up along the tube 5, it assumes the shape of a dish similar to dish 10. Preferably a mandrel (which can also form a part of the piston which pushes it into the cup 9) is disposed inside the tube 5 in order to prevent the edge of the tube 5 from cutting the disc 12, in the case where the mechanical strength of the disc is insufficient. Another possibility would be to turn down the edge of the tube 5 slightly inwardly so that it does not bring a perpendicular edge to bear against the disc 12.

Once the end of the tube 5 which is covered with the disc 12 (now formed into a dish) is inserted in the cup 9, the operation continues as described hereinabove and the assembly is brought to the outside diameter of the tube 5 along its whole length by swaging.

In another variant, only the shrunken end of the tube 5 is used to push and deform the disc 12 and as set forth above, this end is inserted in the cup 9 and then made to expand. The outside diameter must in this case be equal to the outside diameter of the tube 5 before shrinking.

In any case, the assembly of the cell is then finished by filling the can thus formed and sealing the cell as set forth hereinabove.

Figure 5A:
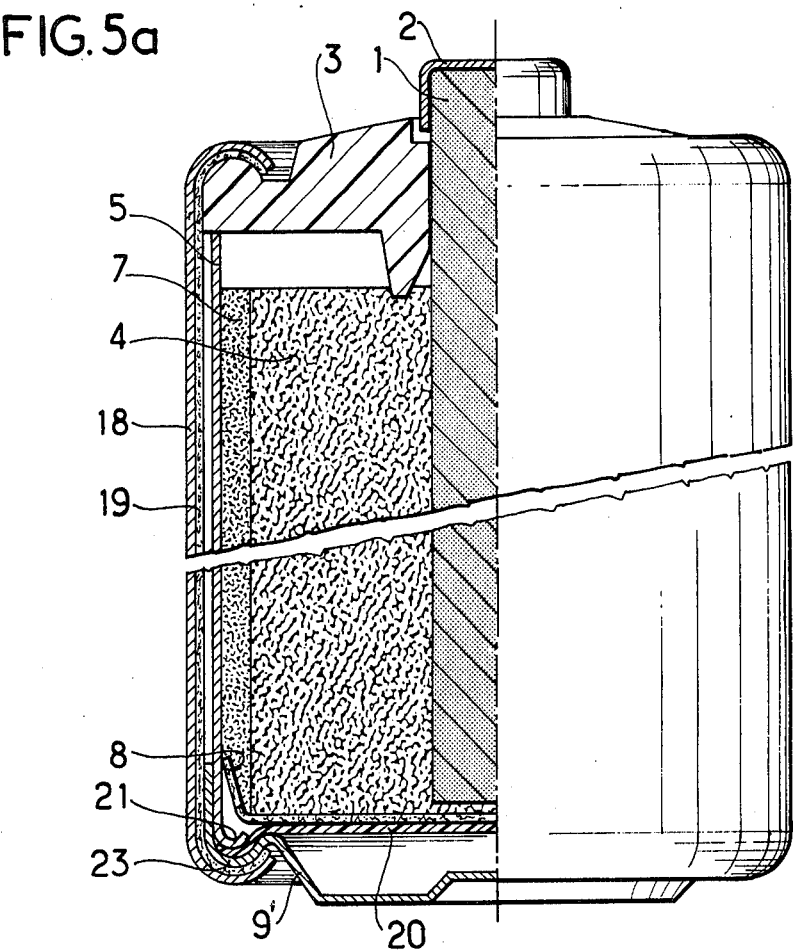
FIG. 5a is a partial cross-section of a third embodiment of a cell embodying the invention.
Figure 5B:
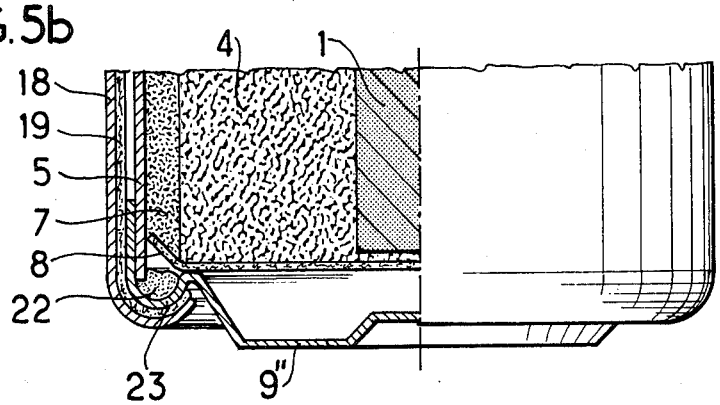
FIG. 5b is a partial cross-section view of the bottom part of a fourth embodiment.

FIGS. 5a and 5b show a cell provided according to a known technique with an exterior metal casing. The reference numerals of FIGS. 1 and 2 have been assigned to the corresponding parts of the cell. Thus, the rod 1 is again shown covered with the cap 2, penetrating into the depolarizer 4 surrounded by the separator 7. A stopper 3 is here laid on the top of the zinc tube 5 and is held clamped against this tube by turning down the metal tube 18 which is interior lined with an insulative tube 19, e.g., made of cardboard. The clamping is performed firstly over the stopper 3, then over the metal cup 9'. The depolarizer 4 rests on a kraft paper disc 8.

On examining firstly FIG. 5a, it will be seen that the end of the tube 5 has been curved at 21 and that it thus co-operates with a curved part 23 formed in the metal cup 9' to clamp the edge of a disc 20 made of a plastic or elastomeric material, which fulfills the function of the gasket disc 10 (formed into a dish) in FIG. 1. Here, the seal is formed between the curved parts 21 and 23 which are clamped together by crimping the tubes 18 and 19 onto the stopper 3 and onto the cup 9'. The profile at the end of the zinc tube, although it is not indispensable, has numerous advantages. It makes the tube more rigid and more fluid-tight since it mates with the interior periphery of the metal cup in the case of a "paper-line" battery, it allows the depolarizer to be injected before the metal cup is installed; this can therefore prevent the metal cup from being dirtied during the first production phases.

Lastly, FIG. 5b shows the tube 5 with a non-curved end sunk into a resilient ring gasket 22 made of an elastomer or a plastic material recessed in the rounded part 23 of the cup 9" which is analogous to the one in FIG. 5a.

It must be understood that the foregoing description has been presented only by way of example and that any part or means can be replaced by equivalent parts or means without departing from the scope of the invention as presented in the appended claims. Variations in structural detail and in operational methods are possible and are contemplated. There is no intention therefore, of limitation to the exact disclosures herein presented.

What is claimed is:

1. An electric cell in which at least the positive active material and the electrolyte are contained in a receptacle partially formed by the negative electrode, said negative electrode being in the form of a tube, a metal cup fitted at one end of said tube, said cup being shaped to provide a bottom part with an up-standing cylindrical wall and constituting the bottom of the receptacle and the negative output terminal of the cell, characterized in that the wall of said tube is continuous, a sealing gasket interposed between the tube and a portion of said metal cup so as to leave at least part of the height of said cylindrical wall of the cup bare whereby a portion of said wall is in direct electrical contact with the tube, and said gasket provides a seal between the tube and a portion of the well of the cup.

2. A cell according to claim 1, wherein said sealing gasket is annular.

3. A cell according to claim 1, wherein said gasket is constituted by a dish made of a plastic material.

4. A cell according to claim 1, wherein said gasket is constituted by a disc made of a plastic material.

5. A cell according to claim 4, wherein the said one end of the tube fitted into the cup is curved.

6. A cell according to claim 1, including means for closing the said receptacle at the other end of said tube comprising a stopper and including a second metal tube surrounding said receptacle, said second tube being turned down over both the stopper and the cup respectively so as to compress the gasket between the first-named end of the first tube and the said cup.

* * * * *